United States Patent
Flohr

(10) Patent No.: US 6,281,662 B1
(45) Date of Patent: Aug. 28, 2001

(54) BATTERY CHARGING DC TO DC CONVERTER

(75) Inventor: Gary Robert Flohr, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/691,400

(22) Filed: Oct. 18, 2000

(51) Int. Cl.[7] .................................................. H02J 7/04
(52) U.S. Cl. ............................................. 320/141; 320/139
(58) Field of Search .................................... 320/141, 139, 320/145, 162, 116, 118

(56) References Cited

U.S. PATENT DOCUMENTS

| | | | |
|---|---|---|---|
| 5,504,415 | * 4/1996 | Podrazhansky et al. | 320/118 |
| 6,031,355 | * 2/2000 | Rich | 320/117 |
| 6,157,165 | * 12/2000 | Kinoshita et al. | 320/116 |
| 6,194,875 | * 2/2001 | Takimoto et al. | 320/141 |

* cited by examiner

Primary Examiner—Peter S. Wong
Assistant Examiner—Lawrence Luk
(74) Attorney, Agent, or Firm—Jennifer Stec

(57) ABSTRACT

A circuit 10 has a high voltage battery 12 that includes a first battery portion $V_1$, a second battery portion $V_2$, and a third battery portion $V_3$. Each of the three battery portions is coupled in series to form the high voltage battery 12. A controller 52 includes a pulse width modulated controller 56 and a voltage sense and comparator circuit 54. Each of the terminals of the battery portions are coupled to a respective switch. By sensing the voltages at the respective terminals, the state of charge of each of the battery portions is determined. The battery portions having the highest state of charge are used to charge the low voltage battery and/or operate the load 50. The controller controls the operation of the switches to provide connections of the battery portions $V_1$–$V_3$ to the load.

9 Claims, 1 Drawing Sheet

BATTERY CHARGING DC TO DC CONVERTER

TECHNICAL FIELD

The present invention relates generally to a DC/DC converter, and more particularly, to a DC/DC converter that allows battery charging from a high voltage battery to a low voltage battery.

BACKGROUND

Battery chargers for charging a low voltage battery from a high voltage battery typically use the entire high voltage battery to reduce down and charge the low voltage battery. Commonly, a high voltage battery is formed of a plurality of lower voltage cells in series. The state of charge of the low voltage battery cells may unequally be discharged when charging the low voltage battery. This may result in a reduced life for the 42 volt battery due to the uneven charging.

It would therefore be desirable to provide a system that increases the life of the high voltage battery by allowing even discharging of portions of the high voltage battery when charging the low voltage battery or providing power to a load.

SUMMARY OF THE INVENTION

It would therefore be desirable to provide a charging and DC/DC converter system that allows the state of charge of the portions of the high voltage battery to be monitored and use evenly discharged so that a relatively even state of charge is maintained at the high voltage battery.

In one aspect of the invention a circuit for battery charging and a DC/DC converter includes a high voltage source having a first battery portion having a first positive terminal and a first negative terminal coupled in series with a second battery portion having a second positive terminal and a second negative terminal so that the second negative terminal is coupled to the first positive terminal. A first switch has an input terminal coupled to the first negative terminal, a control terminal coupled to the controller, and an output terminal coupled to a load. A second switch has a second input terminal coupled to a second negative terminal, a second control terminal is coupled to the controller, and a second output terminal coupled to the load.

One advantage of the invention is that the state of charge of each of the battery portions of the high voltage battery may be monitored and evenly distributed. Another advantage of the invention is that redundancy due to the switches may be obtained. That is, where one or more of the switches fails in the open position, the DC/DC converter can still function and provide a limited amount of energy transfer from the high voltage battery to the load by selecting the remaining good switches. If one of the switches fails in the closed position, the control circuit may select the switch corresponding to the opposite pole of the battery to provide a limited amount of energy transfer from one of the battery portions to the load.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
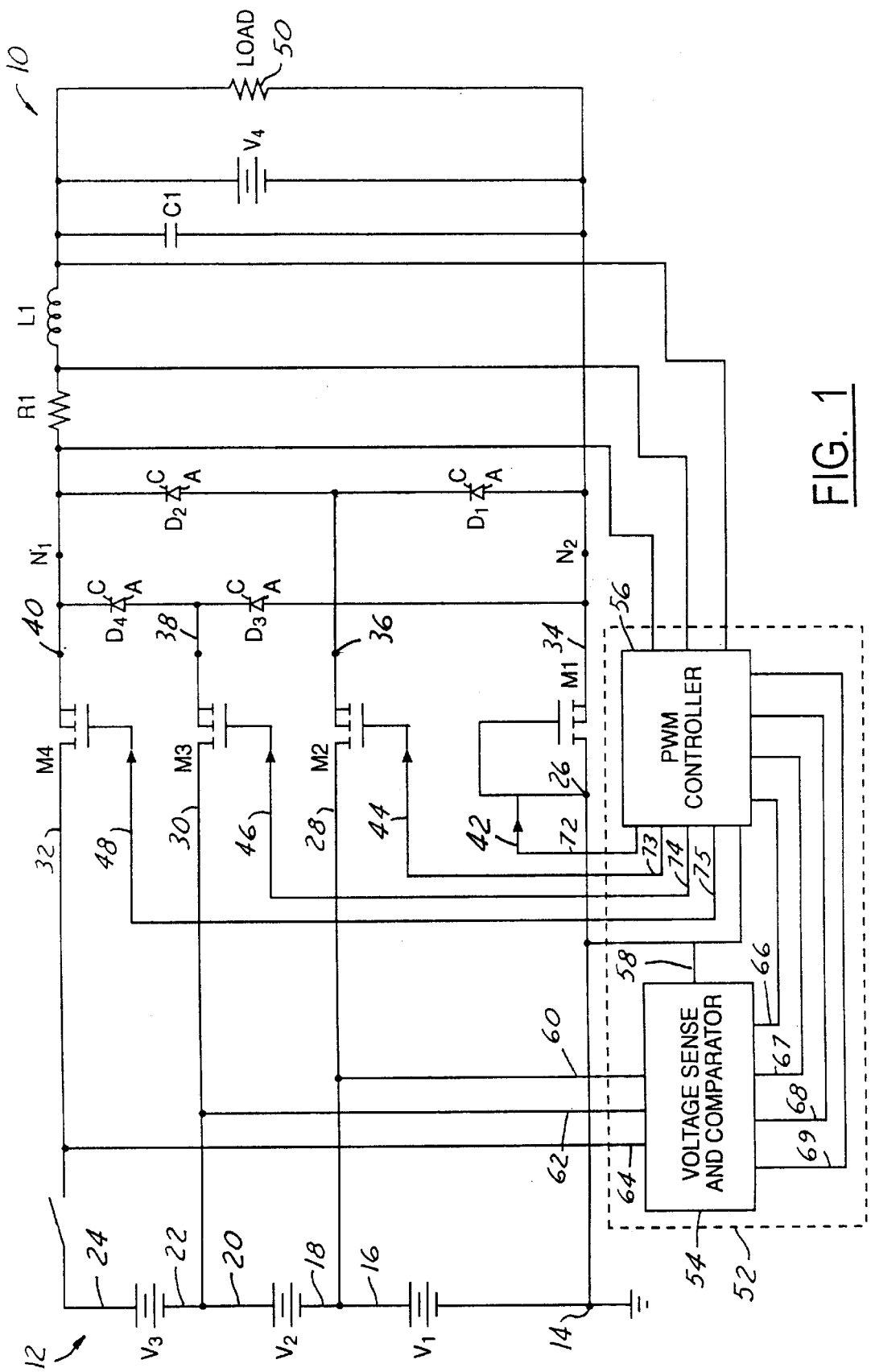
FIG. 1 is a schematic view of a circuit according to the present invention.

In the following description a high voltage battery comprised of three battery portions is illustrated. However, the present invention applies equally to systems having as little as two battery portions that comprise the high voltage battery and to systems having any number of battery portions. The present invention is particularly suitable for 42 volt to 12 volt conversions in automotive vehicles. However, those skilled in the art will recognize that the teachings of the present invention may be applied to DC/DC converters for a number of industries.

Referring now to the figure, a battery charged balancing DC/DC converter 10 is illustrated having a high voltage battery 12 having a first battery portion $V_1$, a second battery portion $V_2$, and a third portion $V_3$. First battery portion $V_1$ has a first negative terminal 14 and a first positive terminal 16. Second battery portion $V_2$ has a second negative terminal 18 and a second positive terminal 20. Third battery portion $V_3$ has a third negative terminal 22 and a third positive terminal 24. Each battery portion $V_1$ through $V_3$ is coupled in series. That is, first positive terminal 16 is coupled to second negative terminal 18; and, second positive terminal 20 is coupled to third negative terminal 22.

Each of the terminals is coupled to a respective switch $M_1$, $M_2$, $M_3$, and $M_4$. Switches $M_1$–$M_4$ are preferably MOSFET switches commonly used in converter applications. Each switch $M_1$–$M_4$ has a respective input terminal 26, 28, 30, and 32. Each switch $M_1$–$M_4$ has an output terminal 34, 36, 38, and 40. Each switch $M_1$–$M_4$ also has a control terminal 42, 44, 46, and 48. Input terminal 26 is coupled to first negative terminal 14. Second input terminal 28 is coupled to first positive terminal 16 and second negative terminal 18. Third input terminal 30 is coupled to second positive terminal 20 and third negative terminal 22. Third positive terminal 24 is coupled to fourth input terminal 32.

A diode $D_1$ is coupled between output terminal 34 and output terminal 36. A second diode $D_2$ is coupled between output terminal 36 and output terminal 40. A third diode $D_3$ is coupled between output terminal 34 and output terminal 38. A fourth diode $D_4$ is coupled between output terminal 38 and output terminal 40. Each diode has a respective anode "A" and a cathode "C" as is known to those skilled in the art. The cathode of each diode is oriented toward output 40 and the anode of each diode is oriented toward output 34. That is, the cathode of diode $D_2$ and the cathode of diode $D_4$ are coupled to a common node $N_1$ that includes output terminal 40. Also, the anode of diode $D_1$ and the anode of diode $D_3$ are coupled to output 34 of switch $M_1$ that includes common node $N_2$.

Node 1 is coupled to a resistor $R_1$ in series with an inductor $L_1$. The inductor $L_1$ is coupled to a capacitor $C_1$ that extends between inductor $L_1$ and node $N_2$. A battery $V_4$ is coupled in parallel with capacitor $C_1$. A load 50 is coupled in parallel with capacitor $C_1$ and batteries $V_4$.

A controller 52 includes a voltage sense and comparator circuit 54 and a pulse width modulator controller 56. Voltage sense and comparator circuit 54 is coupled to each of the terminals of the voltage sources so that the voltage across each voltage source may be determined. That is, a first input 58 is coupled to first negative terminal 14; a second input 60 is coupled to first positive terminal 16 and second negative terminal 18; third input 62 is coupled to second positive terminals 20 and third negative terminal 22; and, fourth input 64 is coupled to third positive terminal 24. The relative voltages of each of the first battery portion $V_1$, second battery portion $V_2$, and third battery portion $V_3$ may thus be determined. The voltage sense and comparator circuit 54 provides an encoded output through outputs 66–69 to pulse width modulated controller 56. The pulse width modulated controller 56 also is coupled to each side of resistor $R_1$ to provide current sensing and to the load 50 to provide load voltage sensing. Pulse width modulated controller 56 has outputs 72–75 coupled to a respective one of the control terminals 42–48. Pulse width modulated controller is also coupled to the first negative terminal 14 which is coupled to ground.

In operation, the voltage of each battery portion $V_1$–$V_3$ is determined in voltage sense and comparator circuit 54. The present invention is used to balance the state of charge of each of the battery portions $V_1$–$V_3$. That is, the battery portion with the highest voltage is coupled to the load to provide charging to the low voltage battery $V_4$ and provide power to load 50. The battery portion with the highest charge is coupled by controlling the associated switch $M_1$–$M_4$ with the particular battery portion. The pulse width modulated controller 56 thus controls the switches associated with the particular battery portion.

If the voltage sense and comparator circuit 54 is greater than the load (plus the corresponding diode drops), then the two switches connecting that voltage portion are switched on to charge the load.

If two voltages such as the voltage for battery portion $V_1$ and voltage for battery portion $V_2$ are both greater than the load, then switches $M_1$ and $M_3$ are selected for pulse width modulating the two together to provide charging.

If battery portion $V_1$, $V_2$, and $V_3$ are greater than the load, then switches $M_1$ and $M_4$ are pulse width modulated so that all of the battery portions contribute to the charge control.

The distinct advantage of the present invention is that the low voltage battery $V_4$ can be charged by any one of the battery portions $V_1$, $V_2$ or $V_3$, or by any combination of the three, except by using V1 and V3 simultaneously. This allows higher voltage charging and is therefore more efficient because of the lower currents therethrough. When the load voltage is greater than each of the voltages V1, V2, and V3 then the pulse width modulated controller does not operate any of the switches $M_1$ through $M_4$.

Advantageously, the present invention balances the state of charge of each battery and provides redundancy in the power semiconductors. Thus, if two or more of switches $M_1$–$M_4$ fail in the open state, the present invention may still function and provide a limited amount of energy transfer from high voltage battery 12 to load 50 by selecting the remaining functioning switches.

Also, if any one switch $M_1$–$M_4$ fails in the closed position, controller 52 can select the switch $M_1$–$M_4$ corresponding to the battery opposite pole and provide a limited amount of energy transfer from one battery portion $V_1$–$V_3$ to load 50.

While particular embodiments of the invention have been shown and described, numerous variations alternate embodiments will occur to those skilled in the art. Accordingly, it is intended that the invention be limited only in terms of the appended claims.

What is claimed is:

1. A circuit comprising:
   a high voltage source having a first battery portion having a first positive terminal and a first negative terminal coupled in series with a second battery portion having a second positive terminal and a second negative terminal so that said second negative terminal is coupled to said first positive terminal;
   a controller circuit;
   a first switch having a first input terminal coupled to said first negative terminal, a first control terminal coupled to said controller, and a first output terminal coupled to a load;
   a second switch coupled to said first positive terminal and said second negative terminal, a second control terminal coupled to said controller, and a second output terminal coupled to said load;
   a third switch having a third input terminal coupled to said second positive terminal, a third control terminal coupled to said controller, and a third output signal coupled to the load;
   said controller circuit coupled to said first control terminal, said second controls terminal, and said third controls terminal when said first voltage of said first battery portion is greater than a load voltage and said second voltage is less than said load voltage, coupling the first voltage portion to a load, when the second voltage of the second battery portion is greater than said load voltage and said first voltage is less than said load, coupling the second voltage to the loads, when the first voltage and second voltage are both greater than the load voltage, pulse width modulating said first voltage portion and said second voltage portion so that the first voltage portion and second voltage portion are alternately coupled to said load.

2. A circuit as recited in claim 1 wherein said load comprises a low voltage battery.

3. A circuit as recited in claim 1 wherein said control circuit comprises the comparator.

4. A circuit as recited in claim 1 wherein said control circuit comprises a pulse width modulated controller.

5. A circuit as recited in claim 1 further comprising a third battery portion having a third positive terminal and a third negative terminal. Said third battery portion coupled in series with said second battery portion so that said third negative terminal is coupled to said second positive terminal.

6. A circuit as recited in claim 5 further comprising a fourth switch having a fourth input terminal coupled to said third positive terminal, a fourth control terminal coupled to said control circuit and a fourth output terminal coupled to said load, said control circuit coupling said third battery portion to said load when said third voltage is greater than said second voltage and said first voltage, when said third and second voltage are greater than said first voltage coupling said second and third battery portions to said load, when said second voltage and said first voltage are greater than said third voltage, coupling said first and second voltage to said load, when said first and third voltages are greater than said second voltage coupling said first and third voltage to said load.

7. A method of controlling a circuit comprises the steps of:
   providing a high voltage source having a first battery portion and a second battery portion, said first battery portion having a first positive terminal and a first negative terminal, said second battery portion having a second positive terminal and a second negative terminal so that said second negative terminal is coupled to said first positive terminal;
   monitoring a load voltage;
   monitoring a first voltage of said first battery portion and a second voltage of said second battery portion;

when the first voltage is greater than said load voltage and said second voltage is less than said load voltage, coupling the first voltage portion to the load;

when the second voltage is greater than said load voltage and said first voltage is less than said load, coupling the second voltage portion to the load;

when the first voltage and the second voltage are both greater than the load voltage, pulse width modulating said first voltage portion and said second voltage portion so that said first voltage portion and said second voltage portion are alternately coupled to said load.

8. A method as recited in claim 7 further comprising the steps of:

providing a third voltage portion;

monitor a third voltage of said third voltage portion;

when the third voltage is greater than said load and said third voltage is greater than said second voltage and said first voltage, coupling the third voltage portion to said load;

when said third voltage and said second voltage are greater than said load voltage and said first voltage is less than said load voltage, coupling said first and second battery portions to said load;

when said second voltage and said first voltage are greater than said load voltage and said third voltage is less than said load voltage coupling said second voltage portion and said first voltage portion to said load;

when said load voltage is greater than a predetermined voltage decoupling said first voltage portion, said second voltage portion and said third voltage portion from said load.

9. A method of charge balancing for a high voltage battery comprising multiple battery portions coupled in series comprising the steps of:

monitoring the voltage of each of the battery portions to determine a state of charge of each of the battery portions;

coupling the battery portions having a voltage greater than the load voltage to the load by pulse width modulating one of a plurality of switches respectively coupled to said battery portions.

* * * * *